(12) United States Patent
Wheeler et al.

(10) Patent No.: US 9,016,980 B2
(45) Date of Patent: Apr. 28, 2015

(54) APPARATUS FOR DRILLING SITE CONTAINMENT

(71) Applicants: Matthew Wheeler, Longview, TX (US);
Lee Honeycutt, Longview, TX (US);
Chris Allen, Columbia Crossroads, PA (US)

(72) Inventors: Matthew Wheeler, Longview, TX (US);
Lee Honeycutt, Longview, TX (US);
Chris Allen, Columbia Crossroads, PA (US)

( * ) Notice: Subject to any disclaimer, the term of this patent is extended or adjusted under 35 U.S.C. 154(b) by 99 days.

(21) Appl. No.: 13/688,517

(22) Filed: Nov. 29, 2012

(65) Prior Publication Data

US 2014/0147212 A1 May 29, 2014

(51) Int. Cl.
*B09B 1/00* (2006.01)
*B09C 1/00* (2006.01)
*E21B 41/00* (2006.01)

(52) U.S. Cl.
CPC .. *B09C 1/00* (2013.01); *E21B 41/00* (2013.01)

(58) Field of Classification Search
CPC ........ B65D 90/24; E02D 31/004; B09C 1/00; E21B 41/00
USPC ........... 405/52, 60, 107, 114, 129.45, 129.55, 405/129.57, 129.6, 129.7, 129.75, 129.8, 405/129.85
See application file for complete search history.

(56) References Cited

U.S. PATENT DOCUMENTS

| | | | | |
|---|---|---|---|---|
| 5,454,195 A | * | 10/1995 | Hallsten | 52/169.1 |
| 5,689,920 A | * | 11/1997 | Hallsten | 52/169.1 |
| 6,258,430 B1 | * | 7/2001 | Perlman | 428/57 |
| 6,695,534 B2 | * | 2/2004 | Cain et al. | 405/52 |
| 2004/0096276 A1 | * | 5/2004 | Startteim et al. | 405/129.8 |
| 2012/0076588 A1 | * | 3/2012 | Dupuis et al. | 405/107 |
| 2013/0105475 A1 | * | 5/2013 | Marshall | 220/4.12 |
| 2013/0121768 A1 | * | 5/2013 | Powell et al. | 405/114 |

* cited by examiner

*Primary Examiner* — Frederick L Lagman
(74) *Attorney, Agent, or Firm* — Conley Rose, P.C.; Grant Rodolph

(57) ABSTRACT

An apparatus for protecting against environmental contamination at a drilling site is disclosed. The apparatus is used to form a perimeter around the drilling site, the interior of which is covered by a geomembrane. The portion of the geomembrane found along the perimeter is placed in the groove of the apparatus's base. A key block is then fit into the grove, thereby holding the geomembrane in place by the tension created between the base and the key block. At those perimeter locations that will be traversed by vehicles and equipment, two ramp pieces replace the key block in holding the geomembrane tight against the base.

26 Claims, 5 Drawing Sheets

APPARATUS FOR DRILLING SITE CONTAINMENT

CROSS-REFERENCE TO RELATED APPLICATIONS

Not Applicable.

STATEMENT REGARDING FEDERALLY SPONSORED RESEARCH

Not Applicable

BACKGROUND

1. Field of Invention

The present invention relates to apparatuses used to protect against environmental contamination at drilling sites. In particular, the present invention relates to apparatuses designed to place a barrier between the environment and any contamination that may be created from drilling operations.

2. Description of Related Art

There is a need to prevent environmental contamination at drilling sites. Due to the dramatic increase in hydraulic fracturing—popularly known as "fracking"—currently taking place in the United States and around the world coupled with the toxic fluid used in such drilling increase the risk for contamination at drilling sites. In addition to the fracking fluid, there are large quantities of fuel, drilling mud, corrosives and flowback water present at many drilling sites. Spills of any of these liquids must be reported to regulatory agencies, and the contaminated soil and water must be remediated. To reduce the amount of contaminated soil and water and to eliminate regulatory fines, many drillers excavate the site, cover it with stone or crushed rock, place a geotextile over the crushed rock, and then loosely place a geomembrane over the surface. Once the layers are installed at the well site, the geomembrane is pulled over earthen berms, railroad ties or corrugated pipe to form containment walls around the perimeter. The geomembrane then contains the leaks and spills for subsequent removal (e.g., by vacuum).

There are problems inherent with the afore-described containment systems. Earthen berms, railroad ties and corrugated pipe do not hold the geomembrane firmly in place, causing the geomembrane to fold up or bunch which creates mounds that have to be stepped and driven over. Moreover, such items cannot be placed entirely around the perimeter of the drilling site since entryways need to be in place for trucks and equipment to get to the drilling rig and other machines at the drilling site. This further weakens the positioning of geomembrane and leads to the mounds described above.

Accordingly, there is a need for an apparatus that will stabilize the geomembrane to keep it from folding and bunching, while at the same time allowing vehicles and equipment to traverse containment walls that are created by the apparatus.

SUMMARY

The present invention solves the aforementioned deficiencies. The present invention comprises a base, a key block, and a ramp, all constructed out of a solid and durable material. The base is comprised of a groove running along its length. The base is laid on the ground in a face-up position along the entire perimeter of the drilling site that will be contained. The geomembrane is then rolled out and stretched across the drilling site and on top of the base. Once the geomembrane is in position, the key block is placed over the geomembrane and on top of the groove so that is can be pressed into the groove. When the top of the key block is flush with the top of the base, the friction created inside the groove holds the geomembrane in place. In those places along the perimeter that will be traversed by vehicles and equipment, a ramp is used instead of a key block to hold the geomembrane. The ramp is comprised of two separate but identical pieces that are comprised of a downward-facing tongue at one end and an incline at the opposite end. To use the ramp, the pieces are position to face each other with the downward-facing tongue of each piece positioned over the groove of the base. The tongues are then pressed into the groove until the entire space of the groove is occupied. When in place, the ramp provides a means for vehicles and equipment to traverse the perimeter of the containment system while still holding the geomembrane in place.

DETAILED DESCRIPTION

Figure 1:
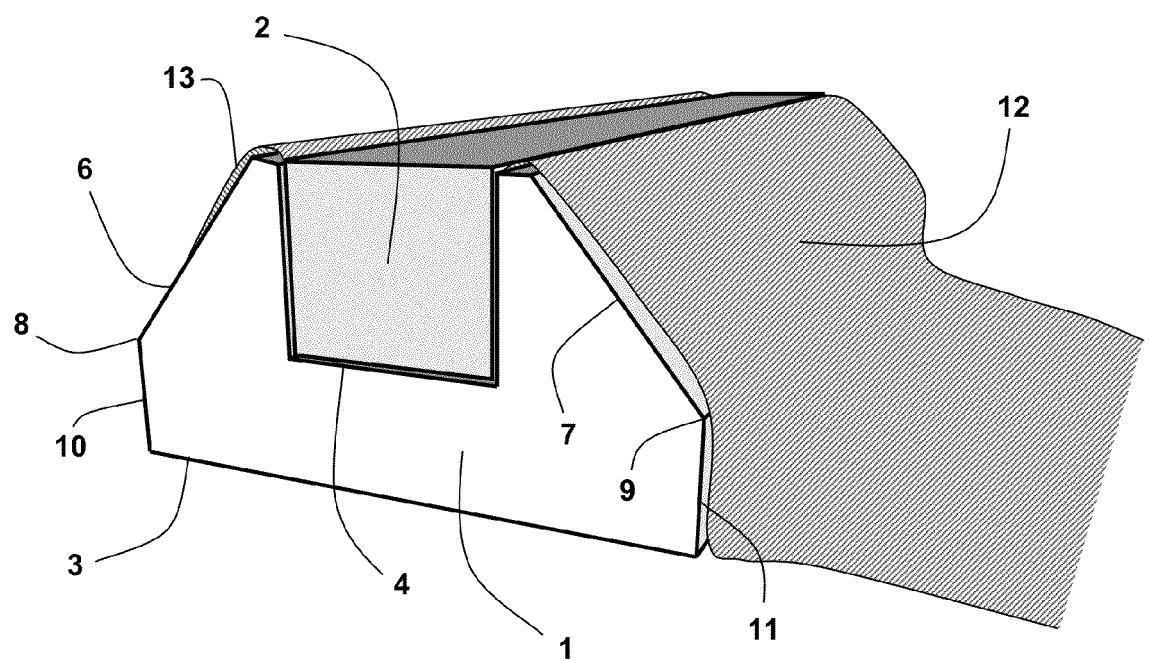
FIG. 1 is a perspective view of an apparatus consistent with the present invention.
Figure 2:
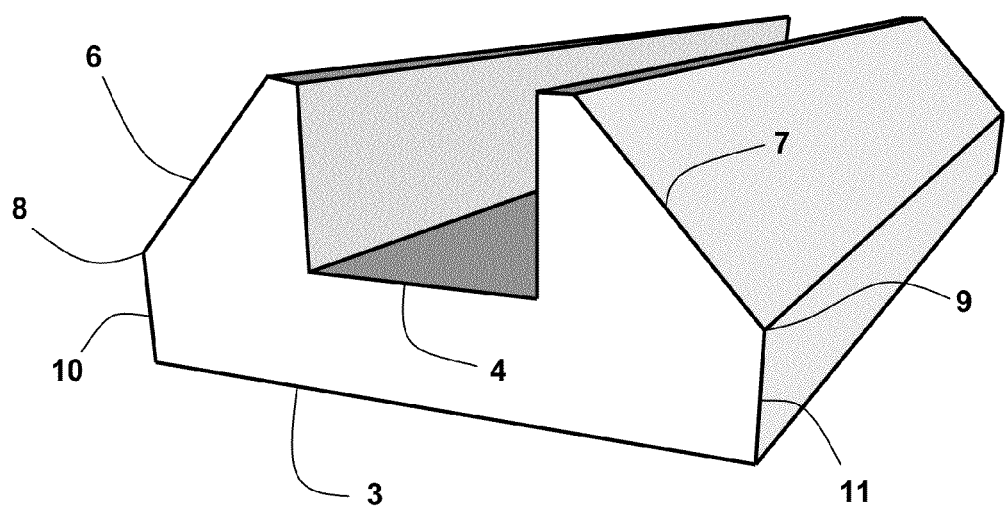
FIG. 2 is a perspective view of a base embodying features of the present invention.

Referring to FIG. 1, one embodiment of the present invention comprises a base 1 and a key block 2. The base 1 and key block 2 may be constructed out of any known solid, durable material, but certain preferred embodiments of these elements are constructed out of a recycled rubber material commercially known as ENVIROform™, a product manufactured and sold by Tire Conversion Technologies, Inc. Referring to FIG. 2, the base 1 comprises a flat bottom surface 3 that will be placed against on the ground at the perimeter of the containment area of the drilling site. The base 1 further comprises a substantially 90° groove 4 that is open towards the top surface 5 of the base 1. The groove 4 shown in FIG. 2 is 5" deep and 7" wide, but any dimensions for the groove 4 will be consistent with the present invention. Both sides of the base 1 comprise a sloped wall (6, 7) running parallel with the groove 4. The sloped walls (6, 7) may be sloped at any angle relative to the vertical and horizontal planes of the base 1, but are preferably sloped at substantially 45°, as is shown in FIG. 2. In preferred embodiments, a joint between the bottom edge (8, 9) of the sloped walls (6, 7) and the bottom surface 3 is formed by side walls (10, 11) running perpendicular to the bottom surface 3 and parallel with the groove 4.

Figure 3:
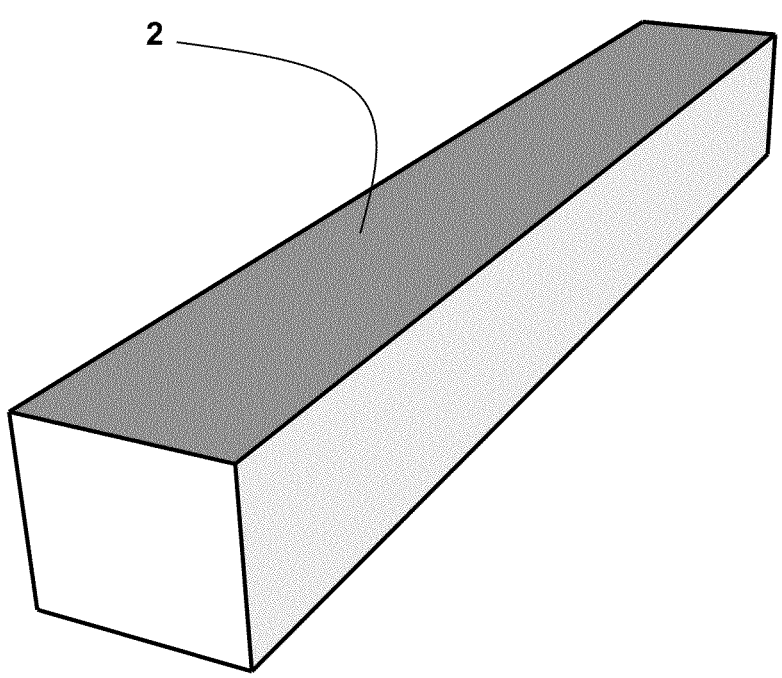
FIG. 3 is a perspective view of a key block embodying features of the present invention.

Referring to FIG. 3, the key block 2 is preferably rectangular cuboid in shape, but any three-dimensional shape capable of fitting snuggly into the groove of the base can be used. In preferred embodiments, the length of each section of key block 2 is substantially equal to the length of each section of base forming the perimeter around the containment area of the drilling site.

Referring back to FIG. 1, when in use, sections of base 1 are laid on the ground to form a complete perimeter around the containment area of the drilling site. One or more layers of geomembrane 12 are then laid to cover the containment area of the drilling site. At the perimeter, the geomembrane 12 is pulled over the base 1 so that it lays on top of the base 1—above the groove 4—and a portion 13 of the geomembrane 12 extends beyond the base 1. The section of key block 2 matching the section of base 1 is then inserted into the groove 4 and thereby forces the portion 13 of geomembrane 12 placed above the groove 4 and beyond the base 1 down into the groove 4. When the key block 2 is fully inserted into the groove 4, the tension created between the groove 4 and key block 2 holds the geomembrane 12 in the groove 4. To remove the geomembrane 12 from the drilling site, the key block 2 is simply pulled out from the groove 4, which releases the tension holding the geomembrane 12 in place.

Figure 4:
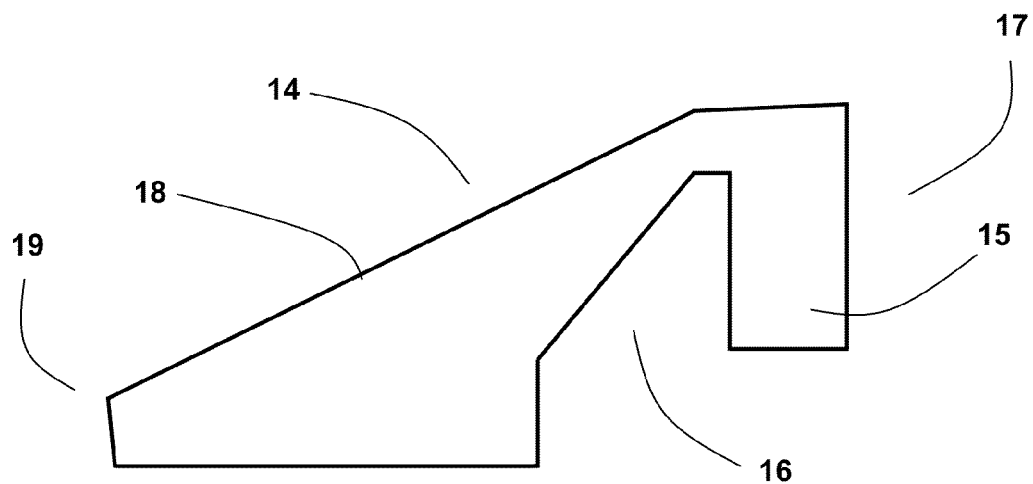
FIG. 4 is a side view of a ramp embodying features of the present invention.

Referring to FIG. 4, preferred embodiments of the present invention further comprise a ramp 14. As shown in FIG. 4, the ramp 14 comprises a tongue 15 and groove 16 along one end 17, and a sloped side 18 along the opposite end 19 of the ramp 14. The tongue 15 and groove 16 are respectfully shaped to snuggly fit into the groove of the base. The sloped side 18 of the ramp 14 can be sloped at any angle, but is preferably sloped at a mild incline to allow vehicles and equipment to climb the sloped side 18 of the ramp 14 with little risk of tipping or being unable to reach the summit of the ramp 14. The ramp 14 may be constructed of any known solid, durable material, but preferred embodiments of the ramp 14 are constructed out of a recycled rubber material commercially known as ENVIROform™, a product manufactured and sold by Tire Conversion Technologies, Inc.

Figure 5:
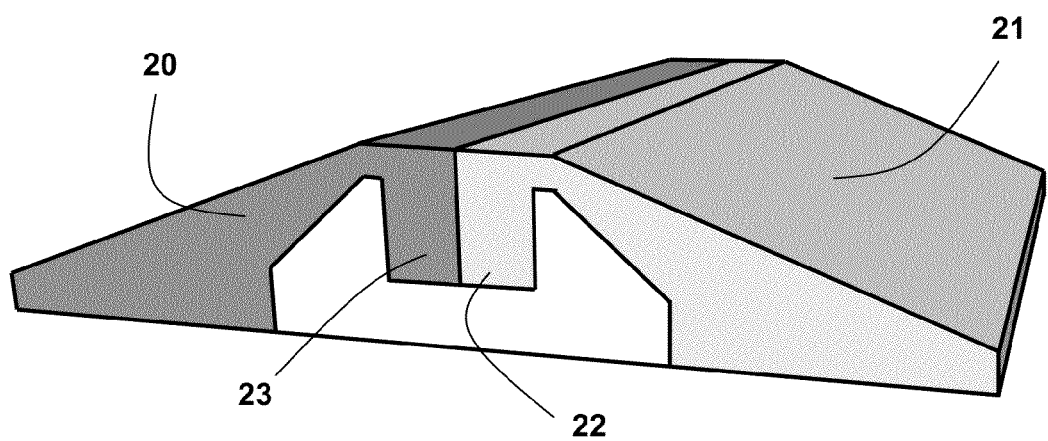
FIG. 5 is a perspective view of a ramp embodying features of the present invention.

Referring now to FIG. 5, a section of the present invention making use of the ramp is shown. Instead of using a key block, two opposing ramps (20, 21) are positioned with their respective tongues (22, 23) placed over the groove 4 of the base 1. The tongues (22, 23) are then inserted into the groove 4 of the base 1 to create a snug fit between the base 1 and the two opposing sections of ramp (20, 21). The tongues (22, 23) of the opposing ramps (20, 21) function as the key block would if it were in use, and holds the geomembrane in place against the base 1. The opposing sections of ramp (20, 21) allow vehicles and equipment to traverse the perimeter of the containment area of the drilling site without having to use a gate or similar device while at the same time keeping the geomembrane in place.

While the invention has been described in conjunction with specific embodiments thereof it is evident that many alternatives, modifications and variations will be apparent to those skilled in the art. Accordingly, the preferred embodiments of the invention, as set forth herein, are intended to be illustrative, not limiting. Various changes may be made without departing from the true spirit and full scope of the invention, as defined in the following claims.

What is claimed is:

1. An apparatus for containing a liquid, comprising:
a base comprising a bottom surface, a top surface, and a groove disposed in the top surface; and
a key block comprising a top having a plurality of edges and a bottom,
wherein the bottom of the key block has a polygonal shape,
wherein the key block is shaped to fit in the groove in such a way as to create tension in a sheet material positioned between the base and the key block such that the base and the key block hold the sheet material in place when a force parallel to the bottom surface is applied to the sheet material, and
wherein the edges of the top of the key block are substantially flush with the top surface of the base when the key block is placed in the groove such that the base and the key block hold the sheet material in place when the force parallel to the bottom surface is applied to the sheet material.

2. The apparatus of claim 1, wherein the base and the key block are made out of metal or a wood-based material.

3. The apparatus of claim 1, wherein the base and the key block are made out of rubber or a recycled rubber material, and wherein the sheet material is a geomembrane.

4. The apparatus of claim 1, wherein neither the base nor the key block puncture the sheet material when the key block is placed in the groove such that the base and the key block hold the sheet material in place when the force parallel to the bottom surface is applied to the sheet material, and wherein neither the base nor the key block damage the sheet material when the key block is placed in the groove such that the base and the key block hold the sheet material in place when the force parallel to the bottom surface is applied to the sheet material.

5. An apparatus for containing a liquid, comprising:
a base comprising a bottom surface, a side wall, a top surface, and a groove disposed in the top surface; and
a ramp comprising an inner side wall and a tongue,
wherein the tongue is shaped to at least partially fit in the groove in such a way as to create tension in a sheet material positioned between the base and the ramp such that the base and the ramp hold the sheet material in place when a force parallel to the bottom surface is applied to the sheet material, and
wherein the sheet material is held between the side wall and the inner side wall when the tongue is placed in the groove such that the base and the ramp hold the sheet material in place when the force parallel to the bottom surface is applied to the sheet material.

6. The apparatus of claim 5, wherein the ramp further comprises two opposing ramp sections.

7. The apparatus of claim 6, wherein the base and the ramp sections are made out of rubber or a recycled rubber material, and wherein the sheet material is a geomembrane.

8. The apparatus of claim 6, wherein the base and the ramp sections are made out of metal or a wood-based material.

9. The apparatus of claim 5, wherein neither the base nor the ramp puncture the sheet material when the tongue is placed in the groove such that the base and the ramp hold the sheet material in place when the force parallel to the bottom surface is applied to the sheet material, and wherein neither the base nor the ramp damage the sheet material when the tongue is placed in the groove such that the base and the ramp hold the sheet material in place when the force parallel to the bottom surface is applied to the sheet material.

10. The apparatus of claim 5, wherein the sheet material makes at least two 90-degree turns when the tongue is placed in the groove such that the base and the ramp hold the sheet material in place when the force parallel to the bottom surface is applied to the sheet material.

11. The apparatus of claim 5, wherein there are no hollow cavities in the base, wherein there are no hollow cavities within the ramp, and wherein the apparatus is substantially free of hollow cavities between the base and the ramp when the tongue is placed in the groove such that the base and the ramp hold the sheet material in place when the force parallel to the bottom surface is applied to the sheet material.

12. The apparatus of claim 5, wherein the base further comprises a sloped wall, wherein the ramp further comprises an inner sloped wall, and wherein the sheet material is held between the sloped wall and the inner sloped wall when the tongue is placed in the groove such that the base and the ramp hold the sheet material in place when the force parallel to the bottom surface is applied to the sheet material.

13. The apparatus of claim 12, wherein the ramp further comprises a sloped portion, and wherein none of the sloped portion fits into the groove when the tongue is placed in the groove such that the base and the ramp hold the sheet material in place when the force parallel to the bottom surface is applied to the sheet material.

14. The apparatus of claim 13, wherein the sloped portion comprises the inner side wall, the inner sloped wall, and an outer sloped side, but not the tongue, and wherein the outer sloped side does not contact the sheet material and does not contact the base when the tongue is placed in the groove such that the base and the ramp hold the sheet material in place when the force parallel to the bottom surface is applied to the sheet material.

15. The apparatus of claim 14, wherein the sloped portion further comprises an outer side wall, and wherein the outer side wall does not contact the base when the tongue is placed in the groove such that the base and the ramp hold the sheet material in place when the force parallel to the bottom surface is applied to the sheet material.

16. An apparatus for containing a liquid, comprising:
a base comprising a bottom surface, a top surface, and a groove disposed in the top surface; and
a key block comprising a top having a plurality of edges,
wherein the key block is shaped to fit in the groove in such a way as to create tension in a sheet material positioned between the base and the key block such that the base and the key block hold the sheet material in place when a force parallel to the bottom surface is applied to the sheet material,
wherein the edges of the top of the key block are substantially flush with the top surface of the base when the key block is placed in the groove such that the base and the key block hold the sheet material in place when the force parallel to the bottom surface is applied to the sheet material,
wherein there are no hollow cavities in the base,
wherein there are no hollow cavities within the key block, and
wherein the apparatus is substantially free of hollow cavities when the key block is placed in the groove such that the base and the key block hold the sheet material in place when the force parallel to the bottom surface is applied to the sheet material.

17. An apparatus for containing a liquid, comprising:
a base comprising a bottom surface, a top surface, and a groove disposed in the top surface; and
a key block comprising a top having a plurality of edges,
wherein the key block is shaped to fit in the groove in such a way as to create tension in a sheet material positioned between the base and the key block such that the base and the key block hold the sheet material in place when a force parallel to the bottom surface is applied to the sheet material,
wherein the edges of the top of the key block are substantially flush with the top surface of the base when the key block is placed in the groove such that the base and the key block hold the sheet material in place when the force parallel to the bottom surface is applied to the sheet material,
wherein the key block substantially fills the groove, wherein the top of the key block and the top surface of the base form a substantially flat upper surface when the key block is placed in the groove such that the base and the key block hold the sheet material in place when the force parallel to the bottom surface is applied to the sheet material, and
wherein the base further comprises at least one sloped wall.

18. An apparatus for containing a liquid, comprising:
a base comprising a bottom surface, a top surface, and a groove disposed in the top surface; and
a key block comprising a top having a plurality of edges,
wherein the key block is shaped to fit in the groove in such a way as to create tension in a sheet material positioned between the base and the key block such that the base and the key block hold the sheet material in place when a force parallel to the bottom surface is applied to the sheet material,
wherein the edges of the top of the key block are substantially flush with the top surface of the base when the key block is placed in the groove such that the base and the key block hold the sheet material in place when the force parallel to the bottom surface is applied to the sheet material, and
wherein the sheet material makes at least two 90-degree turns when the key block is placed in the groove such that the base and the key block hold the sheet material in place when the force parallel to the bottom surface is applied to the sheet material.

19. An apparatus for containing a liquid, comprising:
a base comprising a bottom surface, a to surface, and a groove disposed in the top surface; and
a key block comprising a top having a plurality of edges,
wherein the key block is shaped to fit in the groove in such a way as to create tension in a sheet material positioned between the base and the key block such that the base and the key block hold the sheet material in place when a force parallel to the bottom surface is applied to the sheet material,
wherein the edges of the top of the key block are substantially flush with the top surface of the base when the key block is placed in the groove such that the base and the key block hold the sheet material in place when the force parallel to the bottom surface is applied to the sheet material,
wherein the key block comprises four sides, and
wherein the sheet material contacts at least three of the sides of the key block when the key block is placed in the groove such that the base and the key block hold the sheet material in place when the force parallel to the bottom surface is applied to the sheet material.

20. An apparatus, comprising:
a base comprising a sloped wall and a groove disposed along a length of the base; and
a ramp comprising an inner sloped wall,
wherein at least a portion of the ramp is shaped to fit in the groove in such a way as to create frictional engagement between the base and a sheet material and between the ramp and the sheet material when the sheet material is positioned between the base and the ramp, and
wherein the sheet material contacts the sloped wall and the inner sloped wall when the portion of the ramp is placed in the groove such that the frictional engagement is created between the base and a sheet material and between the ramp and the sheet material when the sheet material is positioned between the base and the ramp.

21. The apparatus of claim 20, wherein neither the base nor the ramp puncture the sheet material when creating frictional engagement with the sheet material, and wherein neither the base nor the ramp damage the sheet material when creating frictional engagement with the sheet material.

22. The apparatus of claim 20, wherein the sheet material makes at least two 90-degree turns when the sheet material is positioned between the base and ramp such that the base and ramp create frictional engagement with the sheet material.

23. The apparatus of claim 20, wherein the ramp further comprises a tongue and a sloped portion, wherein at least part of the tongue fits into the groove when the sheet material is positioned between the base and ramp such that the base and ramp create frictional engagement with the sheet material, and wherein none of the sloped portion fits into the groove when the sheet material is positioned between the base and ramp such that the base and ramp create frictional engagement with the sheet material.

24. The apparatus of claim 20, wherein the base further comprises a side wall, wherein the ramp further comprises an inner side wall, and wherein the sheet material is held between the side wall and the inner side wall when the sheet material is positioned between the base and ramp such that the base and ramp create frictional engagement with the sheet material.

25. The apparatus of claim 20, wherein the sheet material contacts substantially all of the sloped wall and substantially all of the inner sloped wall when the portion of the ramp is placed in the groove such that the frictional engagement is created between the base and a sheet material and between the ramp and the sheet material when the sheet material is positioned between the base and the ramp.

26. The apparatus of claim 20, wherein the sheet material is a geomembrane.

\* \* \* \* \*